United States Patent [19]

Harris et al.

[11] Patent Number: 5,651,028

[45] Date of Patent: Jul. 22, 1997

[54] DATA TRANSMISSION SYSTEM WITH A LOW PEAK-TO-AVERAGE POWER RATIO BASED ON DISTORTING FREQUENTLY OCCURING SIGNALS

[75] Inventors: Johnny Michael Harris, Centerville; Thomas Robert Giallorenzi; David William Matolak, both of Salt Lake City; Dan Michael Griffin, Bountiful, all of Utah

[73] Assignee: Unisys Corporation, Blue Bell, Pa.

[21] Appl. No.: 437,752

[22] Filed: May 9, 1995

[51] Int. Cl.[6] .......................... H04L 25/49; H04L 25/34; H04B 15/00
[52] U.S. Cl. ...................... 375/286; 375/285; 375/296; 375/345; 375/346; 455/63; 455/232.1
[58] Field of Search .................... 375/286, 285, 375/296, 297, 317, 319, 340, 345, 346; 455/234.1, 234.2, 235.1, 232.1, 240.1, 245.1, 245.2, 250.1, 63, 67.3; 330/254

[56] References Cited

U.S. PATENT DOCUMENTS

| | | |
|---|---|---|
| 5,490,172 | 2/1996 | Komara .................. 375/296 |
| 5,497,399 | 3/1996 | Ito ........................ 375/271 |
| 5,526,159 | 6/1996 | Gottwald ................ 359/161 |
| 5,574,990 | 11/1996 | Flanagan ................ 455/115 |
| 5,579,342 | 11/1996 | Crozier .................. 375/296 |

Primary Examiner—Wellington Chin
Assistant Examiner—William Luther
Attorney, Agent, or Firm—Charles J. Fassbender; Mark T. Starr; Steven R. Petersen

[57] ABSTRACT

An electronic data transmission system has a low peak-to-average power ratio by including a transmitter circuit which receives an input signal and in response generates a distorted output signal. This distorted output signal is generated such the output signal has a large magnitude when the input signal has a high probability of occurrence, and the output signal has a small magnitude when the input signal has a low probability of occurrence. The distorted output signal travels over a communication channel to a receiver circuit which regenerates the input signal by amplifying the distorted output signal with a gain that is the inverse of the gain by which the distorted signal is generated.

14 Claims, 12 Drawing Sheets

FIG. 2B eq.1 ~ MAG = $\Sigma$ 1'S - $\Sigma$ 0'S eq.2 ~ $\Sigma$ 0'S = X - $\Sigma$ 1'S eq.3 ~ MAG = $\Sigma$ 1'S - [X - $\Sigma$ 1'S]

eq.4 ~ MAG = 2 $\Sigma$ 1'S - X

FIG. 10

$$\text{eq10} \rightarrow P_{AVE}(FIG.1) = \frac{(1)^2(20)+(3)^2(10)+(5)^2(2)}{32} = 5 \quad \leftarrow 91$$

$$\text{eq11} \rightarrow \frac{P_{PK}}{P_{AVE}(FIG.1)} = \frac{(5)^2}{5} = 5$$

$$\text{eq20} \rightarrow P_{AVE}(FIG.9) = \frac{(3)^2(20)+(4)^2(10)+(5)^2(2)}{32} = 12.18 \quad \leftarrow 92$$

$$\text{eq21} \rightarrow \frac{P_{PK}}{P_{AVE}(FIG.9)} = \frac{(5)^2}{12.18} = 1.92$$

FIG. 14

$$\text{eq30} \rightarrow P_{AVE}(FIG.12) = \frac{(5)^2(20)+(4)^2(10)+(3)^2(2)}{32} = 21.18 \quad \leftarrow 151$$

$$\text{eq31} \rightarrow \frac{P_{PK}}{P_{AVE}(FIG.12)} = \frac{(5)^2}{21.18} = 1.18$$

FIG. 16

| MAG | DMAG' | G   | IG  |
|-----|-------|-----|-----|
| 1   | 5     | 5   | 1/5 |
| 3   | 4     | 4/3 | 3/4 |
| 5   | 3     | 3/5 | 5/3 |

… … …

DATA TRANSMISSION SYSTEM WITH A LOW PEAK-TO-AVERAGE POWER RATIO BASED ON DISTORTING FREQUENTLY OCCURING SIGNALS

BACKGROUND OF THE INVENTION

This invention relates to communication systems; and more particularly, it relates to point-to-multipoint CDMA communication systems.

As used herein, the term "point-to-multipoint" refers to a communication system in which a single transmitting station that is located at one particular point sends separate data sequences to multiple receiving stations which are located at various other points. That is, a first data sequence $D_1$ is sent to a first receiving station, a second data sequence $D_2$ is sent to a second receiving station, etc.; and, all these data sequences are sent at the same time.

One way to operate such a system is to have the transmitting station send each data sequence as an amplitude modulated or frequency modulated or phase modulated signal in its own wireless channel which differs in frequency for each receiving station. However, if the total number of receiving stations in the communication system is large, then a corresponding large number of separate frequency bands is required. Alternatively, the transmitting station can send each of the data sequences over a separate cable to the respective receiving stations. However, when the receiving stations are remotely located from the transmitting station, too much connecting cable is required.

By comparison, with a point-to-multipoint CDMA communication system, the transmitting station sends all of the data sequences in either a single wireless channel or a single cable. By the term "CDMA" is herein meant "Code Division Multiple Access". In a CDMA system, the transmitting station encodes each data sequence that it sends with a respective spreading code which is unique to the receiving station which is to receive the data sequence. That encoded data, for all the receiving stations, is sent simultaneously on a single wireless channel/cable in one frequency band to all of the receiving stations. Then, in each receiving station, the data in any one particular sequence is recovered by multiplying the composite CDMA signal by the same spreading code which was used in the transmitting station to encode the data sequence.

One prior art CDMA communication System is described in U.S. Pat. No. 4,908,836 by Rushforth, et al, entitled "Method and Apparatus for Decoding Multiple Bit Sequences That Are Transmitted Simultaneously in a Single Channel". Also, another CDMA communication system described in U.S. Pat. No. 5,031,173 by Short, et al, entitled "Decoder for Added Asynchronous Bit Sequences". Both of these patents are assigned to the assignee of the present invention.

In the prior art, the transmitting station of the CDMA communication system combined all of the encoded data sequences that were sent simultaneously with analog circuitry; and this circuitry included a separate IF stage for each concurrent data sequence that was transmitted. Consequently, such a transmitter requires a large amount of circuitry when the number of concurrently transmitted data sequences is large.

Also, in the prior art, the composite signal from the transmitting station has a peak-to-average power ratio which increases as the number of concurrently transmitted data sequences increases. This is a problem when the transmissions occur on a channel which has a peak power constraint, since it means that the average power in the transmitted signal decreases as the number of concurrent data sequences increases. And, as the average power decreases, the maximum distance over which the signal can be received decreases.

Accordingly, a primary object of the present invention is to provide an improved point-to-multipoint communication system in which the above-drawbacks are overcome.

BRIEF SUMMARY OF THE INVENTION

In accordance with the present invention, an electronic data transmission system having a low peak-to-average power ratio is comprised of a transmitter circuit which receives a digital input signal which consists of multiple sequences of "1" and "0" chips that are synchronized in parallel, and which in response generates a distorted output signal. More specifically, the distorted output signal is generated with a large magnitude when the input signal has a high probability of occurrence, and it is generated with a small magnitude when the input signal has a low probability of occurrence. That distorted output signal is then sent over a communication channel to a receiver circuit which regenerates the input signal by amplifying the distorted output signal with a gain that is the inverse of the gain by which the distorted signal is generated.

In one embodiment, the distorted output signal has a maximum magnitude when the input signal has a minimum magnitude. Here, the input signal magnitude is the absolute value of the number of "1" chips minus the number of "0" chips that concurrently occur. This distorted output signal monotonically decreases to a non-zero magnitude as the magnitude of the input signal varies from a minimum to a maximum; and the decrease in the magnitude of the distorted output signal can occur at a constant rate or it can occur at a variable rate.

In another embodiment, the distorted output signal increases in magnitude and then decreases in magnitude as the magnitude of the input signal varies from a minimum to a maximum.

To generate the distorted output signal, one embodiment of the transmitter circuit includes a logic circuit which forms a signed multi-bit digital signal which indicates the number of "1" chips minus the number of "0" chips that concurrently occur in the synchronized chip sequences, and a memory circuit. This memory circuit is addressed by the magnitude of the signed multi-bit digital, signal; and in response the memory generates the magnitude of the distorted output signal.

In another embodiment, the distorted output signal from the transmitter circuit is generated by a logic circuit which forms an unsigned multi-bit digital signal which indicates the number of "1" chips that concurrently occur in the synchronized chip sequences, and a memory circuit. This memory circuit is addressed by the unsigned multi-bit digital signal; and in response the memory generates the distorted output signal.

BRIEF DESCRIPTION OF THE DRAWINGS

FIG. 2B shows another set of signals which also occur in the electronic transmitter of FIG. 1;

FIG. 10 is a set of equations which compare the peak-to-average power ratio for the electronic transmitter of FIG. 8 with the peak-to-average power ratio for the electronic transmitter of FIG. 1;

FIG. 14 is a set of equations which give the peak-to-average power ratio for the electronic transmitter of FIG. 12;

FIG. 16 shows an example of how the MAG signal is regenerated in a receiver from the DMAG' signal.

DETAILED DESCRIPTION

Figure 1:
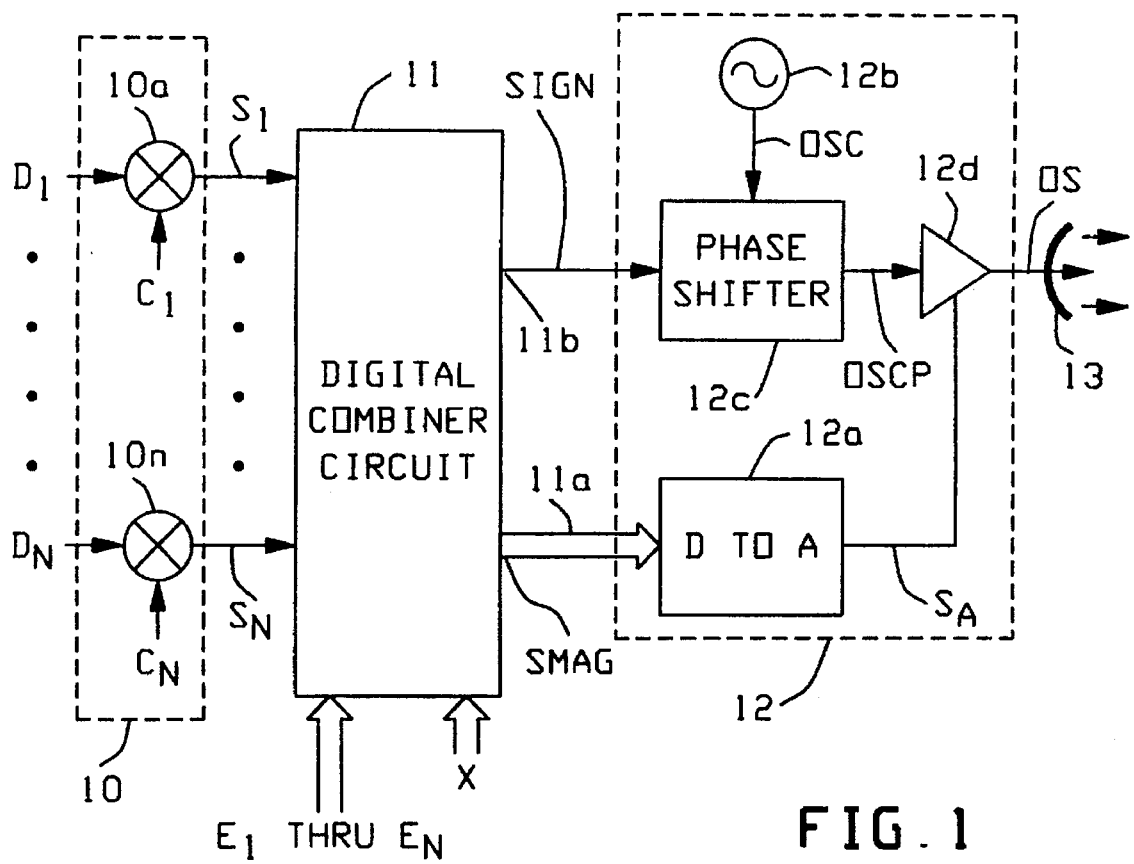
FIG. 1 shows an electronic transmitter which constitutes one preferred embodiment of the present invention.

Referring now to FIG. 1, an electronic transmitter which constitutes one preferred embodiment of the present invention will be described in detail. This electronic transmitter includes an encoder circuit 10, a digital combiner circuit 11, a modulator circuit 12, and an antenna 13. All of these components 10 through 13 are interconnected to each other as shown in FIG. 1.

In operation, the encoder circuit 10 receives a plurality of digital input signals $D_1$ through $D_N$. Each of those digital input signals consists of a sequence of "1" and "0" bits; and the bits in all of those sequences are synchronized together.

Within the encoding circuit 10, the digital input signals $D_1$ through $D_N$ are encoded as respective sequences of "1" and "0" chips. These chip sequences are indicated in FIG. 1 as the signals $S_1$ through $S_N$. All of those chip sequences are also synchronized together.

To produce the chip sequence $S_1$, the digital input signal $D_1$ is encoded with a code $C_1$. This is achieved within the encoder circuit 10 by an EXCLUSIVE-OR gate 10a. Each of the other chip sequences is produced in a similar fashion. For example, the chip sequence $S_N$ is produced by encoding the digital input signal $D_N$ with a code $C_N$; and this is achieved within the encoder circuit 10 by an EXCLUSIVE-OR gate 10n.

Figure 2A:
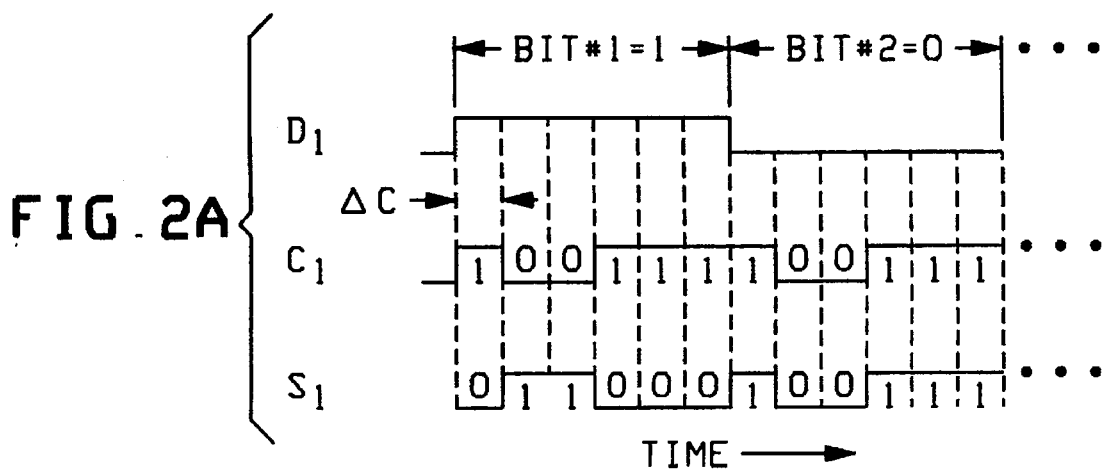
FIG. 2A shows one set of signals which occur in the electronic transmitter of FIG. 1.

FIG. 2A shows one particular example of the digital input signal $D_1$, the code $C_1$, and the chip sequence $S_1$ which is produced by the EXCLUSIVE-OR gate 10a. In this example, each bit in the digital input signal $D_1$ is encoded with a code of six chips. Those six chips are shown as 1, 0, 0, 1, 1, 1; and those six chips repeat for each bit in the input signal $D_1$. To generate signal $S_1$, each bit of the signal $D_1$ is EXCLUSIVE-OR'd with all six chips of the code $C_1$.

From the encoder circuit 10, the synchronized chip sequences $S_1$ through $S_N$ are sent to the digital combiner circuit 11. Then, in the digital combiner circuit 11, a signed multi-bit digital signal is generated which indicates the number of "1" chips minus the number of "0" chips that concurrently occur in the synchronized chip sequences $S_1$ through $S_N$. Signal SMAG on output 11a provides the magnitude of that multi-bit digital signal, and signal SIGN on output 11b provides the sign.

Figure 2B:
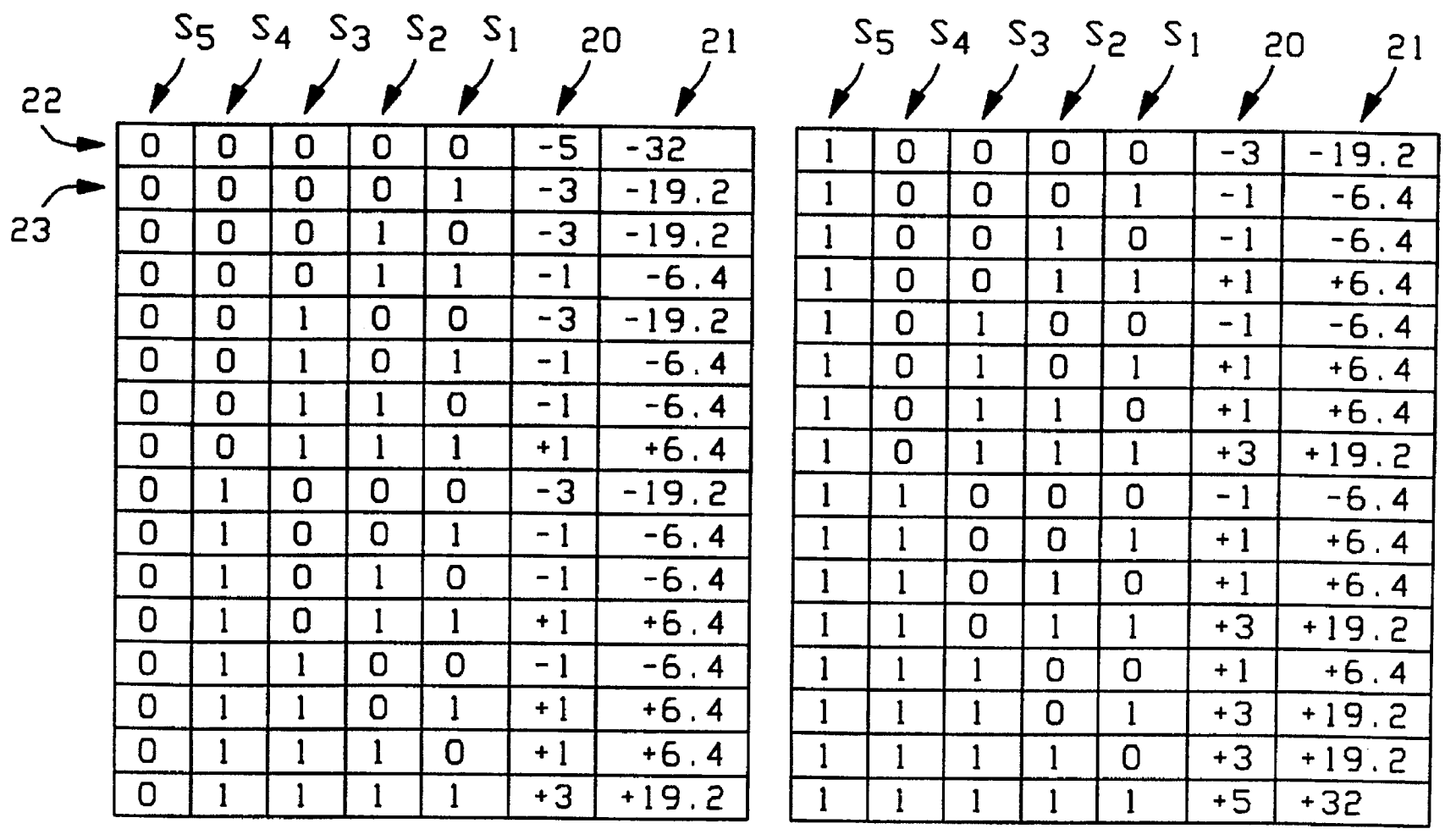

FIG. 2B illustrates one specific example of the SMAG and SIGN signals which the digital combiner circuit 11 generates from the synchronized chip sequences $S_1$ through $S_N$. In this example of FIG. 2B, the digital combiner 11 receives a total of five chip sequences $S_1$ through $S_5$.

When the chips in the sequences $S_1$ through $S_5$ respectively are 0, 0, 0, 0, 0, then the number of "1" chips minus the number of "0" chips equals −5. This is indicated in FIG. 2B by the entry at column 20, row 22. Similarly, when the chips in the sequences $S_1$ through $S_5$ respectively are 1, 0, 0, 0, 0, then the number of "1" chips minus the number of "0" chips equals −3; and this is indicated in FIG. 2B by the entry at column 20, row 23.

Each of the other rows in FIG. 2B shows a different combination of chips that concurrently occur. And, column 20 of FIG. 2B shows the corresponding sign and magnitude of the number of "1" chips minus the number of "0" chips.

For each entry in column 20 of FIG. 2B, another corresponding entry is shown in column 21. This column 21 entry is obtained by multiplying the corresponding entry in column 20 by a predetermined scaling factor. In FIG. 2B, a scaling factor of 32÷5 is used as an example. Signal SMAG on output 11a of the digital combiner circuit 11 is a multi-bit digital signal which gives the magnitude of the entry in column 21; and signal SIGN on output 11b gives the sign of the entry in column 21.

Both of the signals SMAG and SIGN are sent from the digital combiner circuit 11 to the modulator circuit 12; and in response, the modulator circuit 12 generates a sinusoidal analog output signal OS which is transmitted by the antenna 13. This output signal OS has a peak amplitude which is determined by the magnitude of the SMAG signal, and it has a phase which is determined by the SIGN signal.

In order to generate the output signal OS, the modulator circuit 12 includes a digital to analog converter 12a, an RF oscillator 12b, a phase shifter 12c, and an RF amplifier 12d which are interconnected as shown in FIG. 1. In operation, the SIGN signal is sent to the phase shifter 12c along with the OSC signal from the RF oscillator 12d; and in response, the phase shifter generates signal OSCP. Signal OSCP is the same as signal OSC except that its phase is shifted by 180° when the SIGN signal indicates a negative sign. Also in the modulator circuit 12, the SMAG signal is sent through the digital to analog converter 12a to thereby generate an analog signal $S_A$. Then, to generate the output signal OS, signal OSCP is sent through the RF amplifier 12d while the gain of that amplifier is made proportional to the magnitude of the $S_A$ signal.

Figure 3:
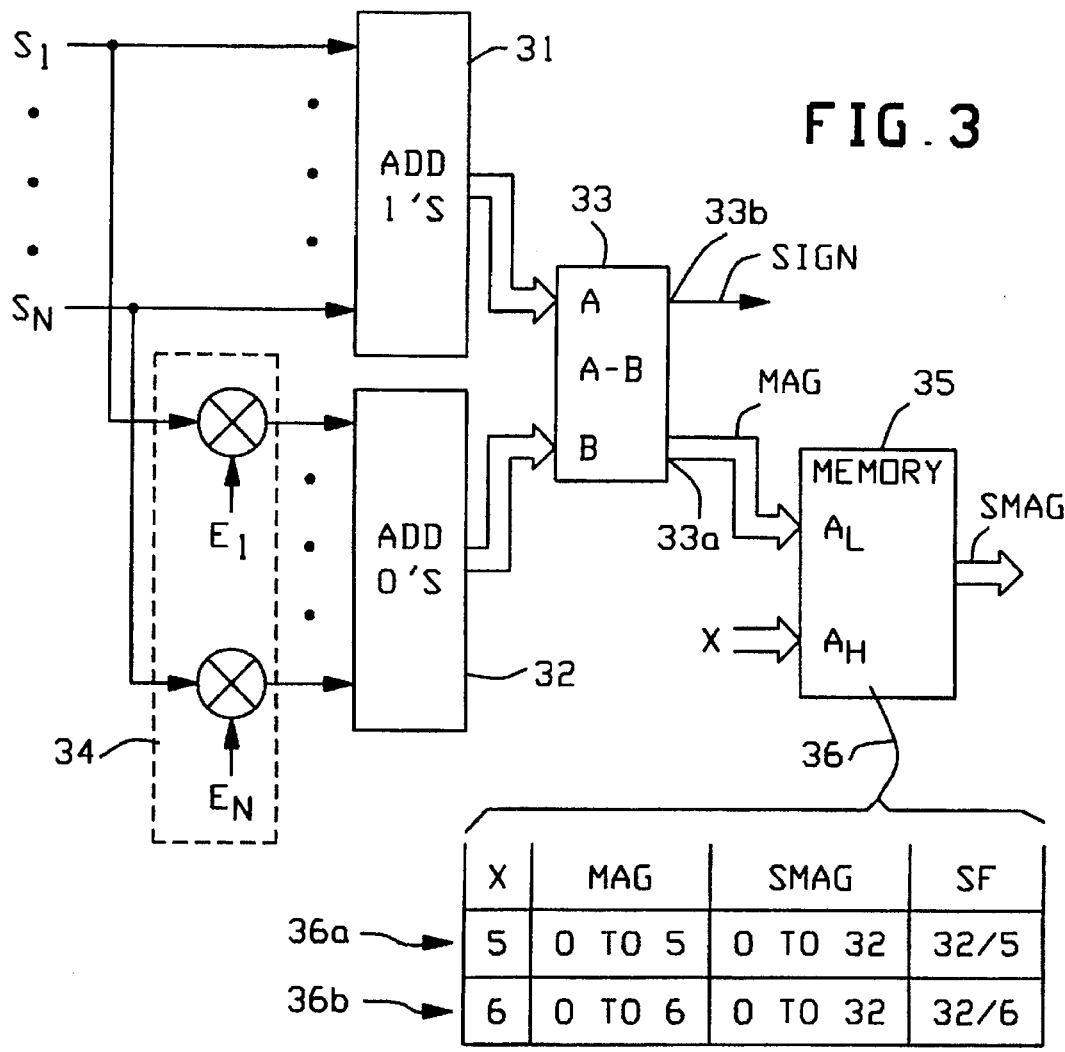
FIG. 3 shows one internal structure for a digital combiner circuit which is included within the electronic transmitter of FIG. 1.

Turning now to FIG. 3, the internal structure of one preferred embodiment of the digital combiner 11 will be described. This FIG. 3 embodiment includes a pair of digital adder circuits 31 and 32, a digital subtractor circuit 33, a control circuit 34, and a memory circuit 35. All of these circuits 31 through 35 are interconnected to each other as shown in FIG. 3.

In operation, the digital of the circuit 31 sums all of the "1" chips which concurrently occur in the chip sequences $S_1$ through $S_N$. At the same time, the digital adder circuit 32 sums all of the "0" chips which get passed through the control circuit 34 and concurrently occur in the chip sequences. Then the digital subtractor circuit 33 subtracts the sum which is formed by the adder circuit 32 from the sum which is formed by the adder circuit 31. This produces a MAG signal which occurs on output 33a, and it also produces the SIGN signal on output 33b. Signal MAG is a binary representation of the number of "1" chips minus the number of "0" chips which concurrently occur in the chip sequences which encode actual data.

For example, the total number of digital input signals $D_1$ through $D_N$ may be thirty-two; but not all thirty-two input signals need to be present all of the time. During one time period, only five input signals $D_1$ through $D_5$ may be present; during another time interval, six input signals $D_1$ through $D_6$ may be present; etc. However, since the signals $D_1$ through $D_N$ only have a "1" and "0" state, it follows that each of the chip sequences $S_1$ through $S_N$ will always be in a "1" state or a "0" state, even though some of the digital input signals $D_1$ through $D_N$ are not actual data signals. Accordingly, in order to generate the correct MAG signal when all digital input signals are not present, the control circuit 34 is provided.

Within the control circuit 34, each of the chip sequences $S_1$ through $S_N$ is EXCLUSIVE-OR'd with a corresponding enable signal $E_1$ through $E_N$. When an enable signal $E_i$ is a "1", all chips in the corresponding chip sequence $S_i$ are inverted before they are sent to the adder circuit 32. By comparison, if the enable signal $E_i$ is a "0", then all chips in the corresponding chip sequence $S_i$ are sent to the adder circuit 32 without being inverted.

Each of the chip sequences $S_1$ through $S_N$ which are sent to the adder circuit 32 without being inverted will have their "1" chips added by both of the adder circuits 31 and 32. Consequently, those sums will cancel each other when they are subtracted by the subtractor circuit 33. As a result, signal MAG gives just the magnitude of the number of "1" chips minus the number of "0" chide in the signals $S_1$ through $S_N$ which encode actual data.

Signal MAG is sent to a set of address inputs $A_L$ on the memory 35. At the same time, an externally generated digital control signal X is sent to another set of address inputs $A_H$ on the memory 35. This control signal X indicates the total number of chip sequences which encode actual data and thus need to be combined. For example, X equals 5 when five chip sequences $S_1$ through $S_5$ encode actual data; X equals 6 when six chip sequences $S_1$ through $S_6$ encode actual data; etc.

Memory 35 stores multiple linearly scaled products SMAG of each value of the signal MAG. And, those linearly scaled products are selectively addressed and read from the memory 35 by the signals which are sent to the memory address inputs $A_L$ and $A_H$. This enables the output signal SMAG, from the memory 35, to be a differently scaled multiple of the signal MAG depending upon the total number of chip sequences that are being combined.

For example, when five chip sequences $S_1$ through $S_5$ are being combined, the signal MAG will vary from 0 to 5. Consequently, in order to make the corresponding output signal SMAG vary from 0 to 32, the signal MAG times the scale factor of 32÷5 is stored in and read from the memory. This is indicated in FIG. 3 by the entries in row 36a of a table 36. Similarly, when six chip sequences $S_1$ through $S_6$ are being combined, the signal MAG will vary from 0 to 6. Thus, in order for the output signal SMAG to continue to vary from 0 to 32, the signal MAG times the scale factor of 32÷6 is stored in and read from the memory. This is indicated by the entries in row 36b of table 36.

By keeping the output signal SMAG in a fixed range (such as 0 to 32) while the maximum magnitude of the input signal MAG varies, various peak power constraints can be met. For example, in FIG. 1, the amplifier 12d will have a peak power limit which must not be exceeded in order for the amplifier to operate properly. Similarly, the signals from the antenna 13 will have a peak power limit which is imposed by a governmental agency such as the FCC.

Figure 4:
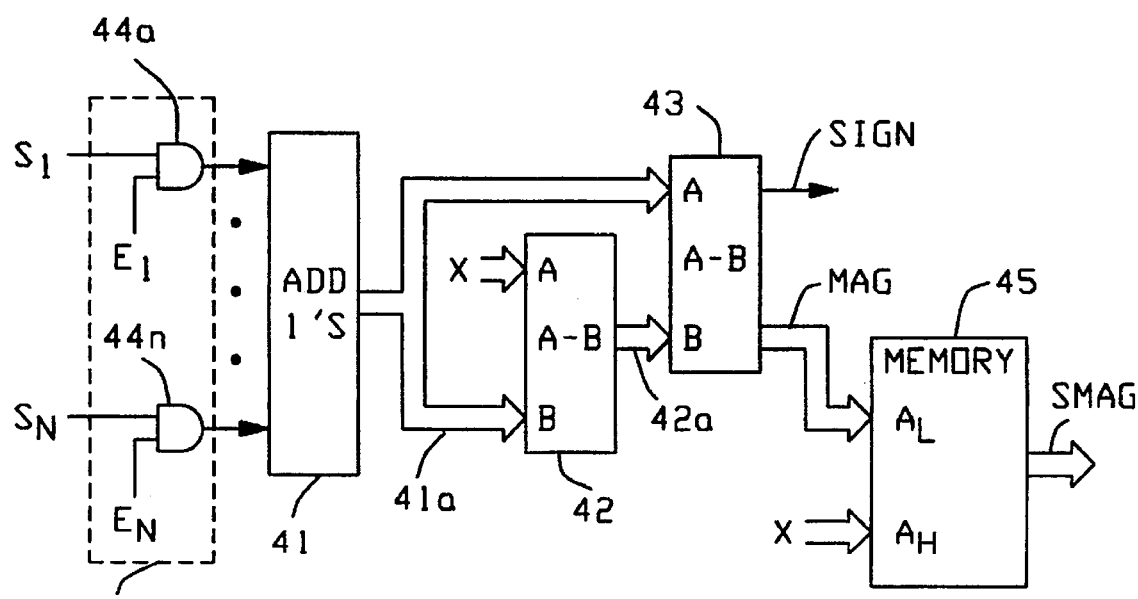
FIG. 4 shows another internal structure for the digital combiner circuit which is in the electronic transmitter of FIG. 1.

Now, referring to FIG. 4, the internal structure of another preferred embodiment of the digital combiner 11 will be described. This FIG. 4 embodiment includes a digital adder circuit 41, a pair of digital subtractor circuits 42 and 43, a control circuit 44, and a memory circuit 45. All of these components 41 through 45 are interconnected as shown in FIG. 4.

In operation, the enable circuit 44 selectively passes the chip sequences $S_1$ through $S_N$ to the adder circuit 41. This is achieved by a set of AND gates 44a through 44n which are included within the control circuit 44. Each of the AND gates 44a through 44n receives a respective one of the chip sequences $S_i$ and it also receives a corresponding enable signal $E_i$, where "i" ranges from "1" to "N". When the enable signal $E_i$ is a "1", the corresponding chip sequence $S_i$ is passed to the adder 41; whereas when the enable signal $E_i$ is a "0", the corresponding chip sequence $S_i$ is inhibited from passing to the adder circuit 41.

Adder circuit 41 sums all of the "1" chips that concurrently occur in the synchronized chip sequences $S_i$ through $S_N$ and which are passed through the control circuit 44. That sum is then sent on an output 41a to both of the subtractor circuits 42 and 43. In the subtractor circuit 42, the sum from the adder circuit 41 is subtracted from the total number of chip sequences X which encode actual data. This subtraction operation generates a signal on the subtractor's output 42a.

Circuit 43 operates by subtracting the signal on output 42a from the signal on output 41a. Those two signals respectively indicate the number of "0" chips and the number of "1" chips that concurrently occur in the chip sequences $S_1$ through $S_N$ which encode actual data. Consequently, the signals SIGN and MAG from the subtractor circuit 43 respectively give the sign and the magnitude of the number of "1" chips minus the number of "0" chips which concurrently occur in the signals $S_1$ through $S_N$ and encode actual data.

Signal MAG from the subtractor circuit 43 is sent to a set of address inputs $A_L$ on the memory 45; and at the same time, the externally generated digital control signal X is sent to another set of address inputs $A_H$ on the memory 45. This memory 45 is identical to the same as the previously described memory 35 of FIG. 3. That is, memory 45 stores multiple linearly scaled products of each value of the signal MAG; and those linearly scaled products are selectively addressed and read from the memory 45 by the signals on address inputs $A_L$ and $A_H$. Thus, the output signal SMAG from the memory 45 is a linearly scaled multiple of the signal MAG with the particular scale depending upon the total number of chip sequences X that encode actual data.

Next, with reference to FIGS. 5 and 6, still another preferred embodiment of the digital combiner circuit 11 will be described. This embodiment has an internal structure which is shown in FIG. 6, and the basis for the FIG. 6 structure is provided by a set of equations which are shown in FIG. 5.

Figures 5, 6:
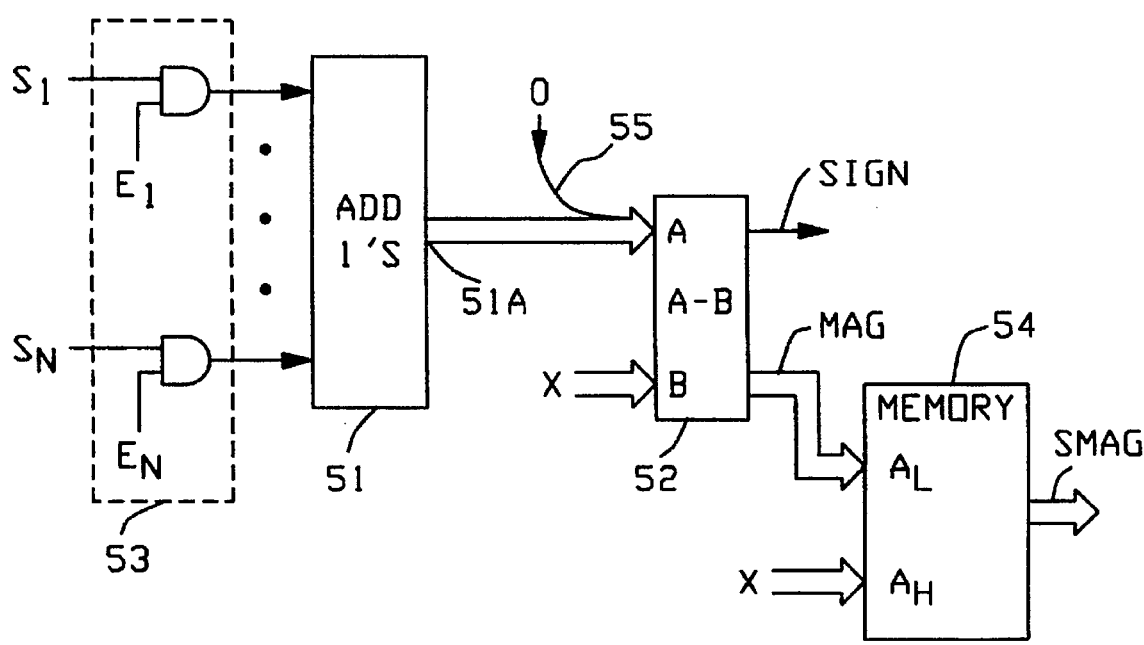
FIG. 5 is a set of equations which provide the basis of another internal structure for the digital combiner circuit in the electronic transmitter of FIG. 1.
FIG. 6 shows the internal structure of a digital combiner circuit which is based on the equations of FIG. 5.

Equation eq1 of FIG. 5 states that the signal MAG is a multi-bit binary representation of the number of "1" chips minus the number of "0" chips which concurrently occur in the chip sequences $S_1$ through $S_N$ and encode actual data. Equation eq2 states that the number of "0" chips in equation eq1 can be expressed as the total number of chip sequences x which encode actual data minus the number of "1" chips in equation eq1. Substituting equation eq2 into equation eq1 yields equation eq3; and then rearranging the various terms of equation eq3 yields equation eq4.

Equation eq4 states that the signal MAG equals twice the number of "1" chips that concurrently occur in the chip sequences $S_1$ through $S_N$ which encode actual data minus the total number of chip sequences X which encode actual data. This equation eq4 is the basis for the digital combiner circuit of FIG. 6.

Included in the FIG. 6 embodiment is an adder circuit 51, a subtractor circuit 52, a control circuit 53, and a memory circuit 54. All of these components 51 through 54 are interconnected as shown in FIG. 6.

In operation, the encoder circuit 53 passes all of the chip sequences which encode actual data to the adder 51; and, all other chip sequences which do not encode actual data are inhibited from reaching the adder 51. This is achieved by providing the control circuit 53 with the same internal structure as the previously described control circuit 44 of FIG. 4.

All of the "1" chips that concurrently occur in the chip sequences $S_1$ through $S_N$ and which pass through the control circuit 53 are added by the adder circuit 51; and the resulting sum occurs on the adder's output 51a. That sum from the adder 51 is multiplied by two by appending a "0" to the least significant bit; and this is indicated by reference numeral 55 in FIG. 6.

Subtractor circuit 52 subtracts the total number of chip sequences X which encode actual data from twice the sum that is formed by the adder circuit 51. Thus, subtractor circuit 52 carries out the subtraction operation which is indicated in equation eq4 of FIG. 5. Consequently, the signals SIGN and MAG from the subtractor circuit 52 respectively indicate the sign and magnitude of the number of "1" chips minus the number of "0" chips which concurrently occur in the chip sequences $S_1$ through $S_N$ and which encode actual data.

Signal MAG from the subtractor circuit 52 is sent to a set of address inputs $A_L$ on the memory 54; and at the same time, the control signal X is sent to another set of address inputs $A_H$ on the memory 54. Here again, the memory 54 is the same as the previously described memories 35 and 45 in that it stores multiple linearly scaled products of each value of the signal MAG. Those linearly scaled products are selectively addressed and read from the memory 54 by the signals on the $A_L$ and $A_H$ address inputs. Consequently, the output signal SMAG from the memory 54 is a linearly scaled multiple of the signal MAG with the particular scale depending upon the total number of chip sequences X that encode actual data.

Figure 7:
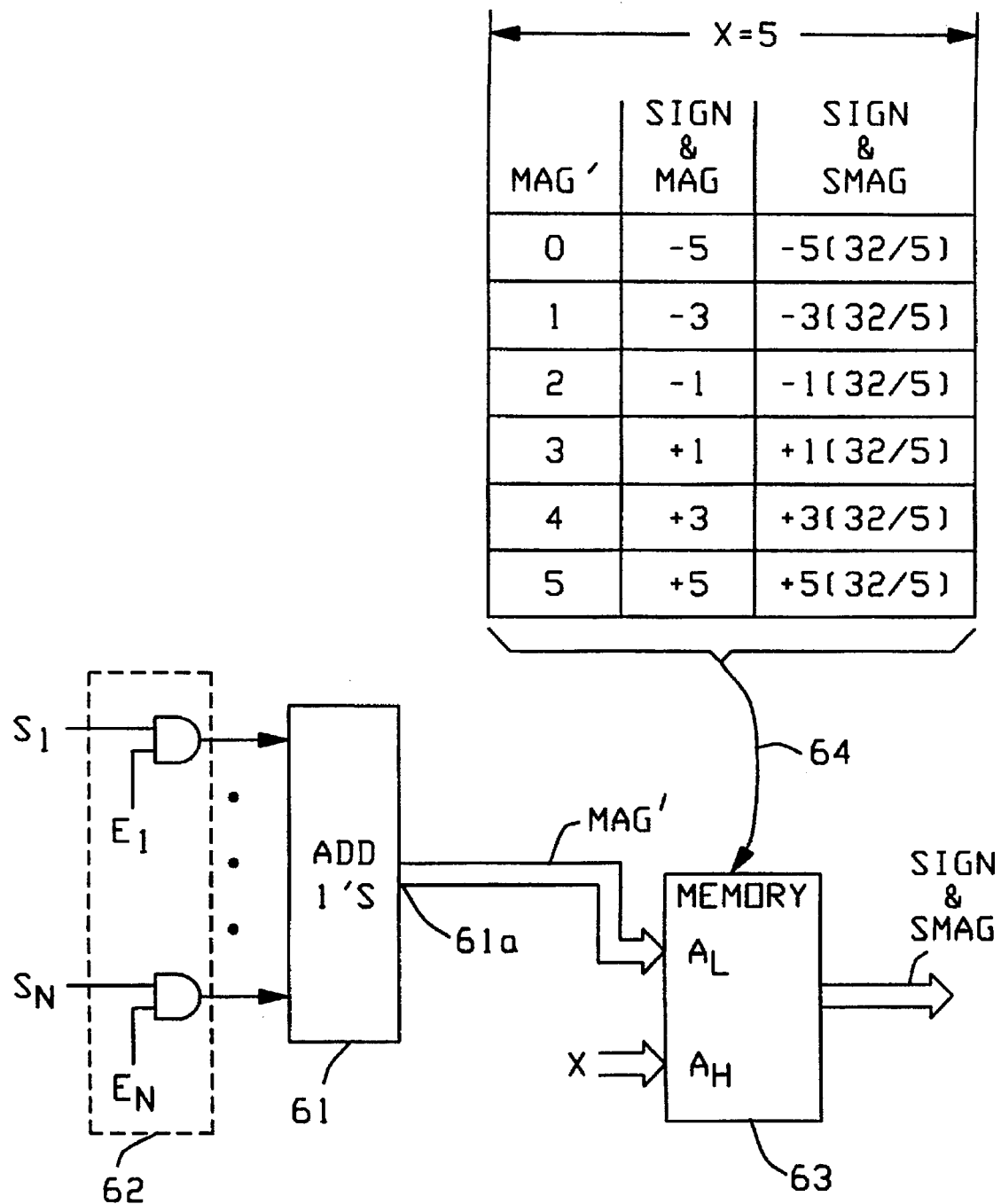
FIG. 7 shows still another internal structure for the digital combiner circuit which is in the FIG. 1 electronic transmitter.

Next, referring to FIG. 7, the internal structure of yet another preferred embodiment of the digital combiner circuit will be described. This FIG. 7 embodiment includes an adder circuit 61, a control circuit 62, and a memory circuit 63. All of these components are interconnected to each other as shown in FIG. 7.

Control circuit 62 operates in the same manner and has the same internal structure as the previously described control circuit 44 of FIG. 4. Thus, the adder 61 only sums the "1" chips which occur in the chip sequences $S_1$ through $S_N$ which encode actual data. That sum is indicated by a signal MAG' which occurs on an output 61a from the adder 61.

Signal MAG' is sent to a set of address inputs $A_L$ on the memory 63; and at the same time, the externally generated digital control signal X is sent to another set of address inputs $A_H$ on the memory 63. For each combination of the signal's MAG' and X, the number of "1" chips minus the number of "0" chips which concurrently occur in the chip sequences $S_1$ through $S_N$ and encode actual data is given by equation eq4 of FIG. 5. Thus, at each storage location which is addressed by the signals X and MAG', the memory 63 stores the corresponding SIGN and SMAG signals. Those stored signals SIGN and SMAG are selectively addressed and read from the memory 63 by the signals MAG' and X which are sent to the memory address inputs $A_L$ and $A_H$.

For example, consider the case where only five of the chip sequences $S_1$ through $S_5$ encode actual data. In that case, X will be equal to 5 and signal MAG' will have values of 0, 1, 2, 3, 4 and 5. This is indicated in FIG. 7 by the left-hand column of table 64.

Also in the table 64, the center column shows the SIGN and MAG signals which correspond to each combination of the X and MAG' signals. For example, when signal MAG' equals 4, the chip sequences $S_1$ through $S_5$ must contain five "1" chips and one "0" chip. Consequently, the number of "1" chips minus the number of "0" chips equals +3. Likewise, when the signal MAG' equals 0, the chip sequences $S_1$ through $S_5$ must contain no "1" chips and five "0" chips. Consequently, the number of "1" chips minus the number of "0" chips equals −5.

Lastly in table 64, the right-hand column shows the SIGN and SMAG signals which are stored in and read from the memory 63. In the right-hand column of table 64, the signal SMAG is obtained by scaling the signal MAG by a factor of 32÷5. This particular scale factor is just one example, since any desired scale factor can be used.

Similarly, when X is equal to 6, the signal MAG' will have values of 0, 1, 2, 3, 4, 5 and 6. For each combination of the signal X=6 and the signal MAG', the corresponding number of "1" chips minus the number of "0" chips can be determined by equation 4. That number is then multiplied by a linear scale factor and the result is stored in the memory 63 at the storage location which is addressed by the signals X=6 and MAG'.

Turning now to FIGS. 8, 9, 10 and 11A through 11C, a second electronic transmitter will be described which is related to the electronic transmitter of FIGS. 1–7 but which has a greatly improved characteristic. Specifically, with the electronic transmitter of FIG. 8, the signals which are transmitted have a much smaller peak-to-average power ratio than the signals which are transmitted by the electronic transmitter of FIG. 1.

Being able to transmit signals with a small peak-to-average power ratio is desirable because it enables the transmitted signal to be received at a further distance without increasing the peak power. As was previously pointed out, the peak power of the transmitted signal will be limited by various power constraints, such as those which are imposed by a governmental agency like the FCC. And, by transmitting a signal with a low peak-to-average power ratio, the average power of the transmitted signal is made large without exceeding the peak power constraint.

Figure 8:
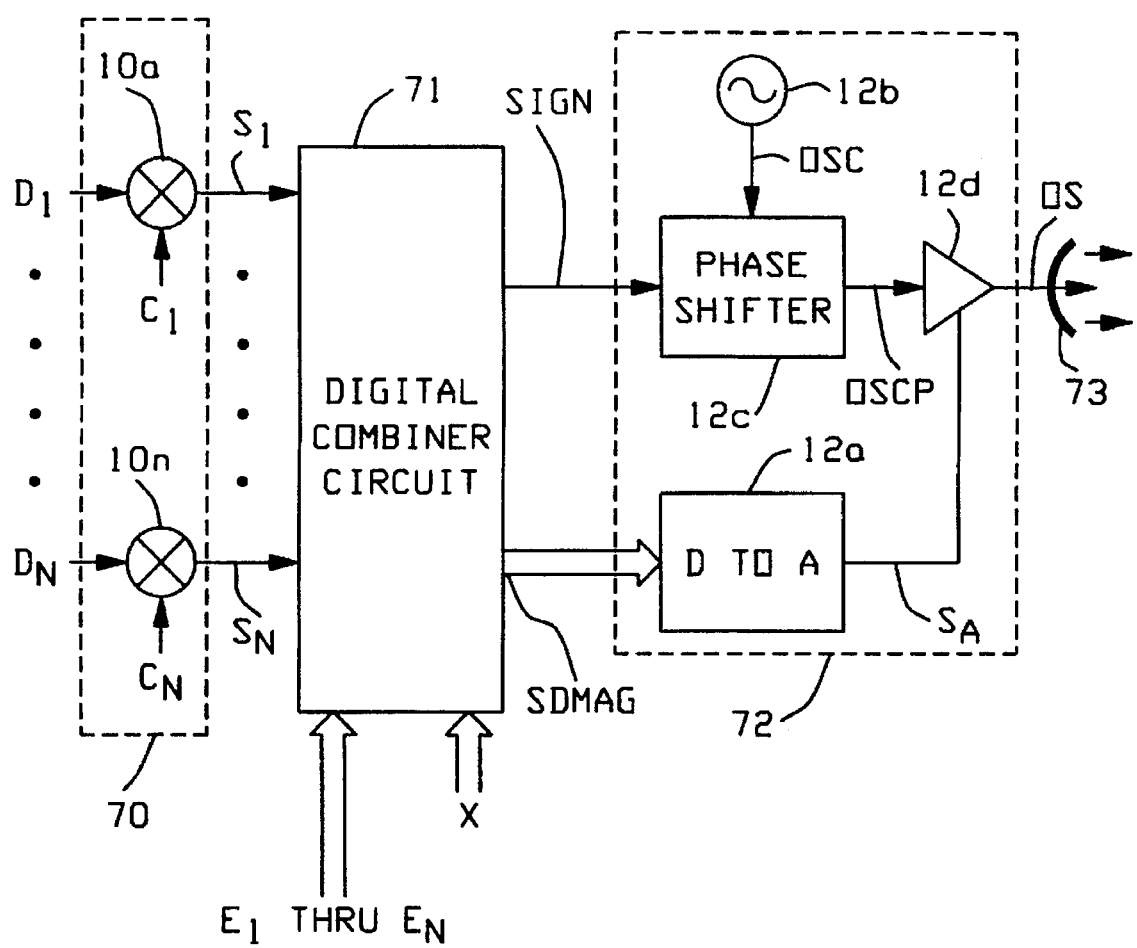
FIG. 8 shows a second electronic transmitter which constitutes a second preferred embodiment of the present invention and which has an improved peak-to-average power ratio over the transmitter of FIG. 1.

In FIG. 8, the electronic transmitter which transmits signals with a low peak-to-average to power ratio is shown as including an encoding circuit 70, a digital combiner circuit 71, a modulator circuit 72, and an antenna 73. All of these components 70 through 73 are interconnected to each other as illustrated.

Components 70, 72, and 73 respectively are identical to the previously described components 10, 12, and 13 in the FIG. 1 electronic transmitter. By comparison, the digital combiner circuit 71 in the FIG. 8 electronic transmitter is different; and due to this difference, the reduced peak-to-average power ratio in the transmitted signal is obtained.

Figure 9:
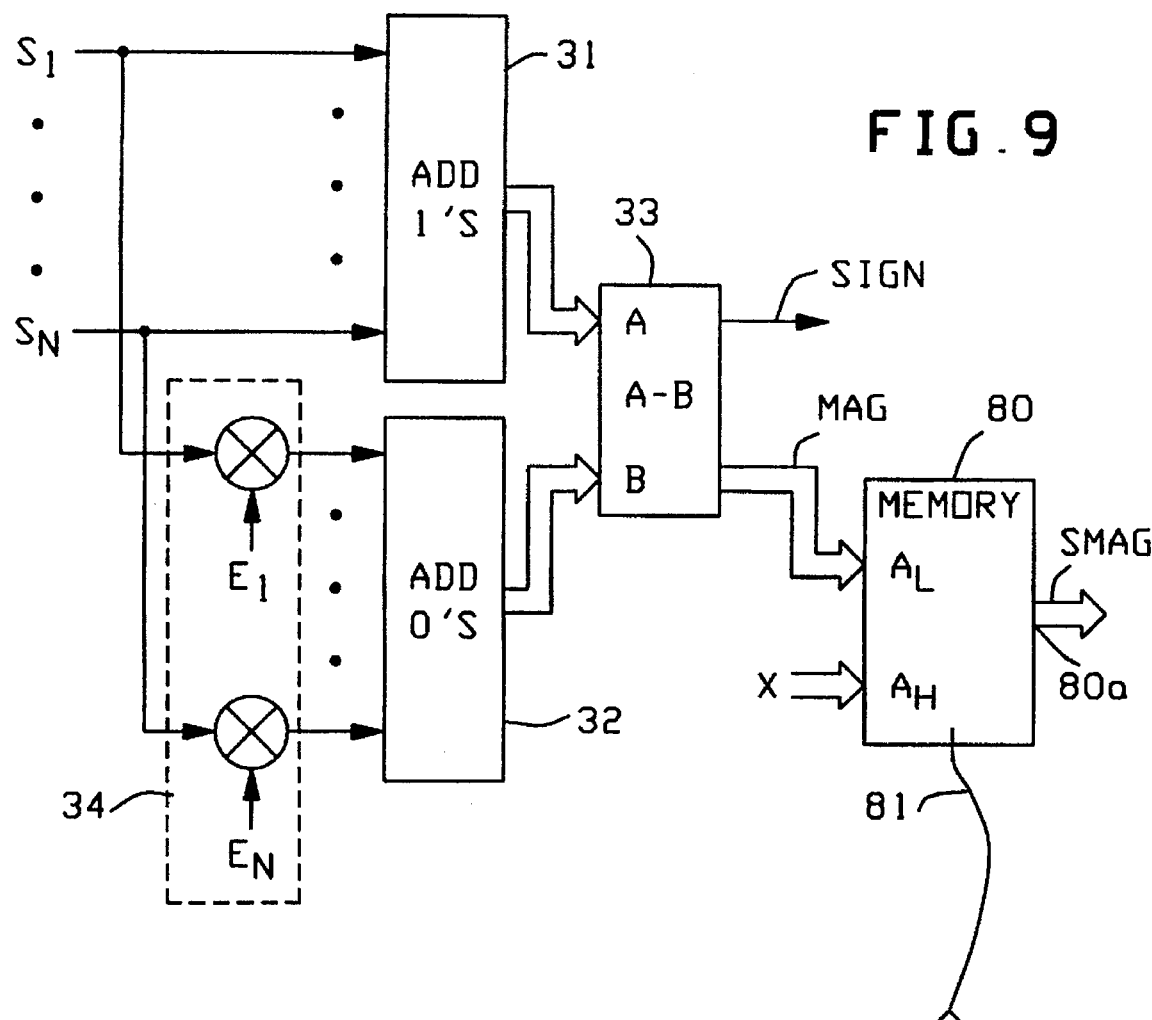
FIG. 9 shows one internal structure for a digital combiner circuit which is included within the electronic transmitter of FIG. 8.

One preferred embodiment of the digital channel combiner circuit 71 is shown in FIG. 9. That embodiment includes components 31, 32, 33, 34 and 80. Components 31 through 34 form the SIGN and MAG signals just like the components 31 through 34 of the FIG. 3 digital combiner circuit; and those SIGN and MAG signals respectively indicate the sign and magnitude of the number of "1" chips minus the number of "0" chips which concurrently occur in the chip sequences $S_1$ through $S_N$ and encode actual data.

By comparison, component 80 is a memory which stores multiple non-linearly distorted representations SDMAG of each value of the signal MAG. Those distorted representations SDMAG are selectively addressed and read from the memory 80 by the signals MAG and X which are sent to the memory address inputs $A_L$ and $A_H$.

In FIG. 9, a table 81 is provided which shows an example of the SDMAG signals that are stored in and read from the memory in response to the address signals X and MAG. Those SDMAG signals which are shown in row 82 are read from the memory 80 when X is equal to five (i.e.—when a total of five chip sequences $S_1$ through $S_5$ encode actual data). By comparison, those SDMAG signals which are shown in row 83 are read from the memory 80 when X is equal to six (i.e.—when six chip sequences $S_1$ through $S_6$ encode actual data).

In the case where X is equal to 5, the signal MAG will have values of 1, 3, and 5. To obtain the corresponding SDMAG signals, the MAG signals of 1, 3 and 5 are non-linearly distorted to 3, 4, and 5. This is indicated in table 81 by the column labeled DMAG. Then, to obtain the SDMAG signals which are stored in the memory 80, the distorted magnitudes DMAG are each multiplied by a scale factor (such as 32÷6).

Similarly, when X is equal to 6, the MAG signal will have values of 0, 2, 4, and 6. To obtain the corresponding output signals SDMAG, the MAG signals of 0, 2, 4, and 6 are non-linearly distorted to 3, 4, 5 and 6. This is indicated in table 81 by the column labeled DMAG. Then, to obtain the SDMAG signals which are stored in the memory 80, each of the distorted magnitudes DMAG is multiplied by 32÷6.

A comparison between the peak-to-average power ratio of the signals which are transmitted by the FIG. 8 circuit and the signals which are transmitted by the FIG. 1 circuit is shown in FIG. 8. In this comparison, the number of chip sequences which encode actual data signals is set to five as one example. Also, to simplify the calculations, a scale factor of one is assumed. Thus, MAG equals SMAG and DMAG equals SDMAG.

To begin the comparison, equation eq10 of FIG. 10 gives an expression for the average power in the transmitted signal from the FIG. 1 circuit. At any one particular time instant, transmitted signal power will be proportional to the square of the magnitude of the signal MAG from the digital combiner circuit 11. For the case where X is equal to five, signal MAG has magnitudes of 1, 3 and 5. Magnitude 1 occurs for twenty different combinations of the chip sequences $S_1$ through $S_5$; magnitude 3 occurs for ten different combinations; and magnitude 5 occurs for two different combinations. Thus, the average power in the transmitted signal from the FIG. 1 circuit may be expressed as shown by term 91 in equation eq10. Then, to obtain the peak-to-average power ratio, the peak power is simply divided by the average power from term 91; and this is performed by equation eq11.

Similarly, equation eq20 of FIG. 10 gives an expression for average power in the signal which is transmitted from the transmitter circuit of FIG. 8. Here, transmitted signal power at any one particular time instant is proportional to the square of the signal DMAG. For the case where X is equal to five, signal DMAG has magnitudes of 3, 4, and 5. Magnitude 3 occurs for twenty different combinations of the chip sequences $S_1$ through $S_5$; magnitude 4 occurs for ten different combinations and magnitude 5 occurs for two different combinations. Consequently, the average power in the transmitted signal from the FIG. 8 circuit can be expressed as shown by term 92 in equation eq20. Then, to obtain the peak-to-average power ratio, the peak power is divided by the average power as given by the term 92; and this is performed by equation eq21.

A comparison of equation eq21 with equation eq11 shows that the peak-to-average power ratio for the FIG. 8 circuit is more than two times smaller than the peak-to-average power ratio for the FIG. 1 circuit. This is an important feature since it means that the maximum distance over which signals from the FIG. 8 circuit can be received is significantly larger than the maximum distance over which signals from the FIG. 1 circuit can be received.

All of the calculations which occur in the equations of FIG. 10 can be repeated for different values of X. And, such calculations show that as X increases, the improvement in the peak-to-average power ratio which is obtained by the FIG. 8 transmitter also increases.

Figure 11A:
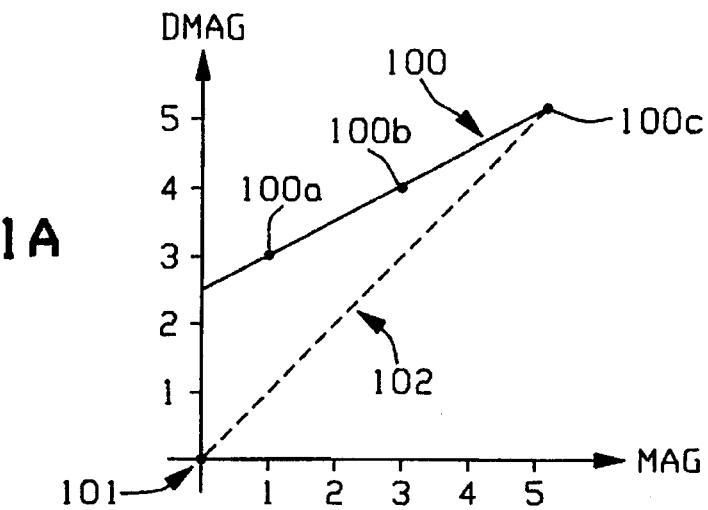
FIG. 11A shows one example of the relation between the signals MAG and DMAG which occur in the electronic transmitter of FIG. 8.

Turning now to FIG. 11A, it illustrates in a graphical form the relation between the signal MAG and its distorted representation DMAG for the case where X is equal to five. There, on a curve 100, three points 100a, 110b and 100c respectively show that the MAG signal of magnitudes 1, 3, and 5 are non-linearly distorted to the DMAG signal of magnitudes 3, 4, and 5. By comparison, if the signal MAG was simply amplified in a linear fashion to obtain the DMAG signal, then MAG and DMAG would be graphically related by a straight line which passes through the graph's origin 101. Such a line is indicated in FIG. 11A by referenced numeral 102.

It is to be understood, of course, that FIG. 11A shows just one specific example of the manner in which the signal MAG may be non-linearly distorted in order to decrease the peak-to-average power ratio of the transmitted output signal. Two other examples are shown in FIGS. 11B and 11C.

Figure 11B:
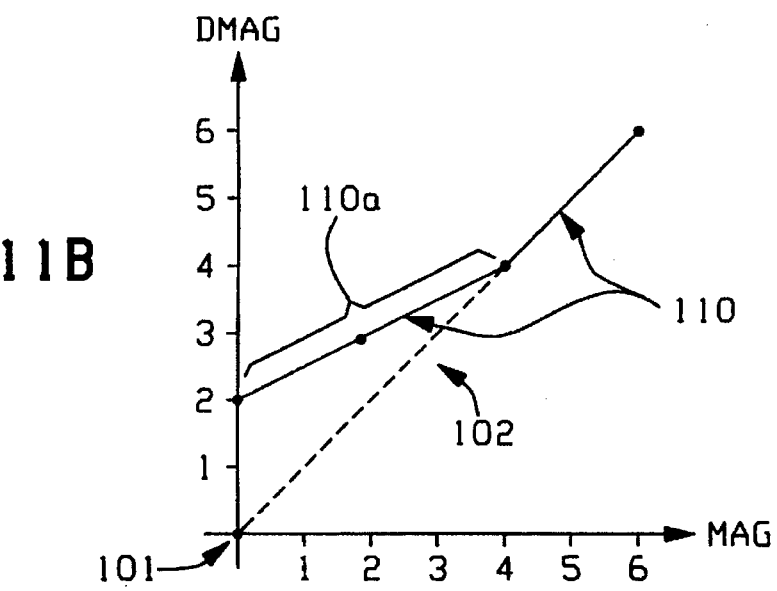
FIG. 11B shows another example of the relation between the signals MAG and DMAG which occur in the electronic transmitter of FIG. 8.

In FIG. 11B, the relation between the signal MAG and its non-linearly distorted representation DMAG, is given by a curve 110 for the case where X is equal to six. With this distortion, only a portion of the input signal MAG is distorted in a non-linear fashion; and, that portion is indicated by reference numeral 110a.

In FIG. 11B, the average power of the DMAG signal will be larger than the average power of the MAG signal because the non-linear distortion 110a makes at least some magnitudes of the DMAG signal larger than the corresponding magnitudes of the MAG signal. At the same time, the DMAG signal and the MAG signal have the same peak power because their peak amplitudes are the same.

Figure 11C:
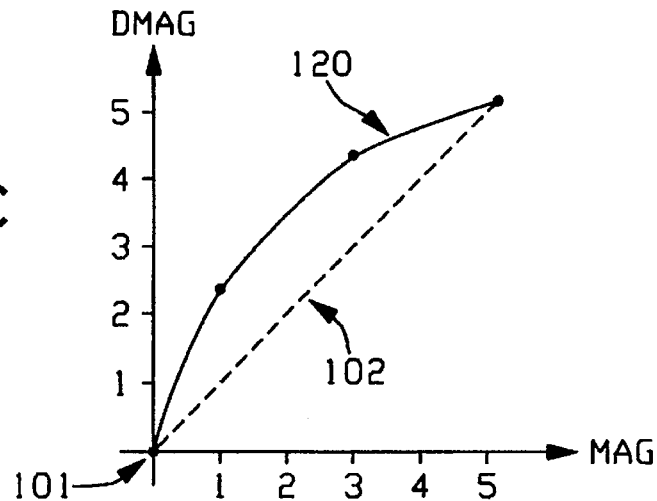
FIG. 11C shows still another example of the relation between the signals MAG and DMAG which occur in the electronic transmitter of FIG. 8.

In FIG. 11C, the relation between the signal MAG and its distorted representation DMAG is shown by a curve 120. With this distortion, the distorted output signal DMAG decreases in magnitude at a variable rate as the magnitude of the MAG signal varies from a maximum to a minimum.

In FIG. 11C, the average power of the DMAG signal will be larger than the average power of the MAG signal because the variable rate non-linear distortion makes certain magnitudes of the DMAG signal larger than the corresponding magnitude of the MAG signal. But here again, the DMAG signal and the MAG signal have the same peak power because their peak amplitudes are the same.

One characteristic of the distortion which occurs in all of the FIGS. 11A, 11B, and 11C is that the distorted output signal DMAG has a maximum magnitude when the signal MAG is at a maximum magnitude. That maximum DMAG magnitude divided by the maximum MAG magnitude defines one particular gain G. And, a second characteristic of the distortion which occurs in FIGS. 11A–11C is that the distorted signal DMAG is larger than the signal MAG times the gain G when the input signal is in a predetermined range below the maximum magnitude. As long as the MAG and DMAG signals are related by a non-linear distortion which has these two characteristics, the DMAG signal will have an improved peak-to-average power ratio.

Turning next to FIGS. 12, 13, 14, and 15A through 15C, a third electronic transmitter will be described which is related to the electronic transmitters of FIGS. 1–11c but which operates on a different principal. With the electronic transmitter of FIG. 12, distorted output signals SDMAG' are again generated which have a small peak-to-average power ratio in comparison to the MAG signal. But, the SDMAG' signal is generated with a magnitude which is proportional to the probability of occurrence of the corresponding MAG signal.

Thus, the SDMAG' signal has a large magnitude when the corresponding MAG signal has a high probability of occurrence even though that corresponding MAG signal may have a small magnitude. Conversely, the SDMAG' has a small magnitude when the corresponding MAG signal has a low probability of occurrence even though that corresponding MAG signal may have a large magnitude.

Figure 12:
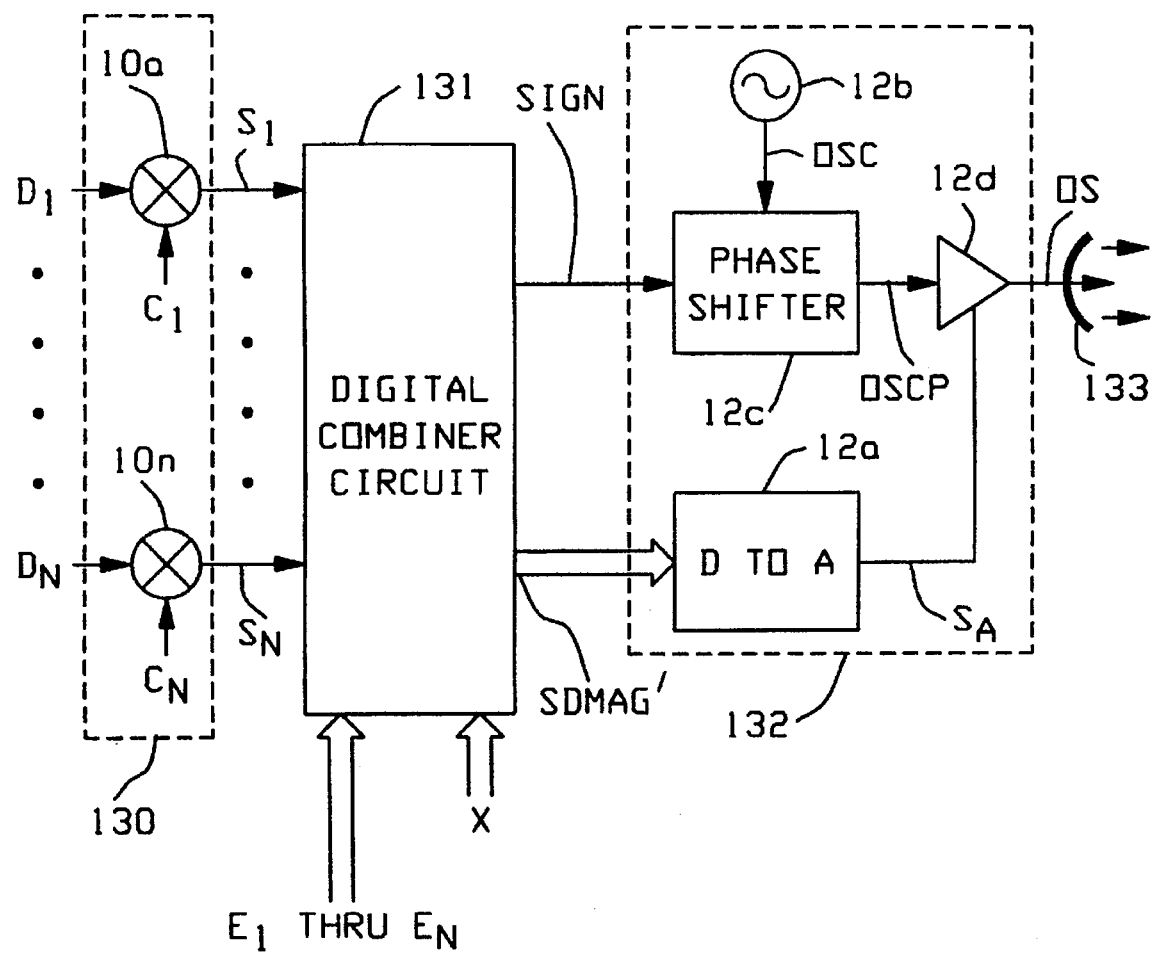
FIG. 12 shows a third electronic transmitter which constitutes a third preferred embodiment of the present invention and which has an improved peak-to-average power ratio over the transmitters of FIGS. 1 and 8.

In FIG. 12, the electronic transmitter which operates on the above-principal is shown as including an encoding circuit 130, a digital combiner circuit 131, a modulator circuit 132, and an antenna 133. All of these components 130 through 132 are interconnected to each other as illustrated.

Each of the components 130, 132, and 133 respectively is identical to the previously described components 10, 12, and 13 of the FIG. 1 electronic transmitter. By comparison, the digital channel combiner 131 in the FIG. 12 electronic transmitter is different in that it generates the signal SDMAG'.

Figure 13:
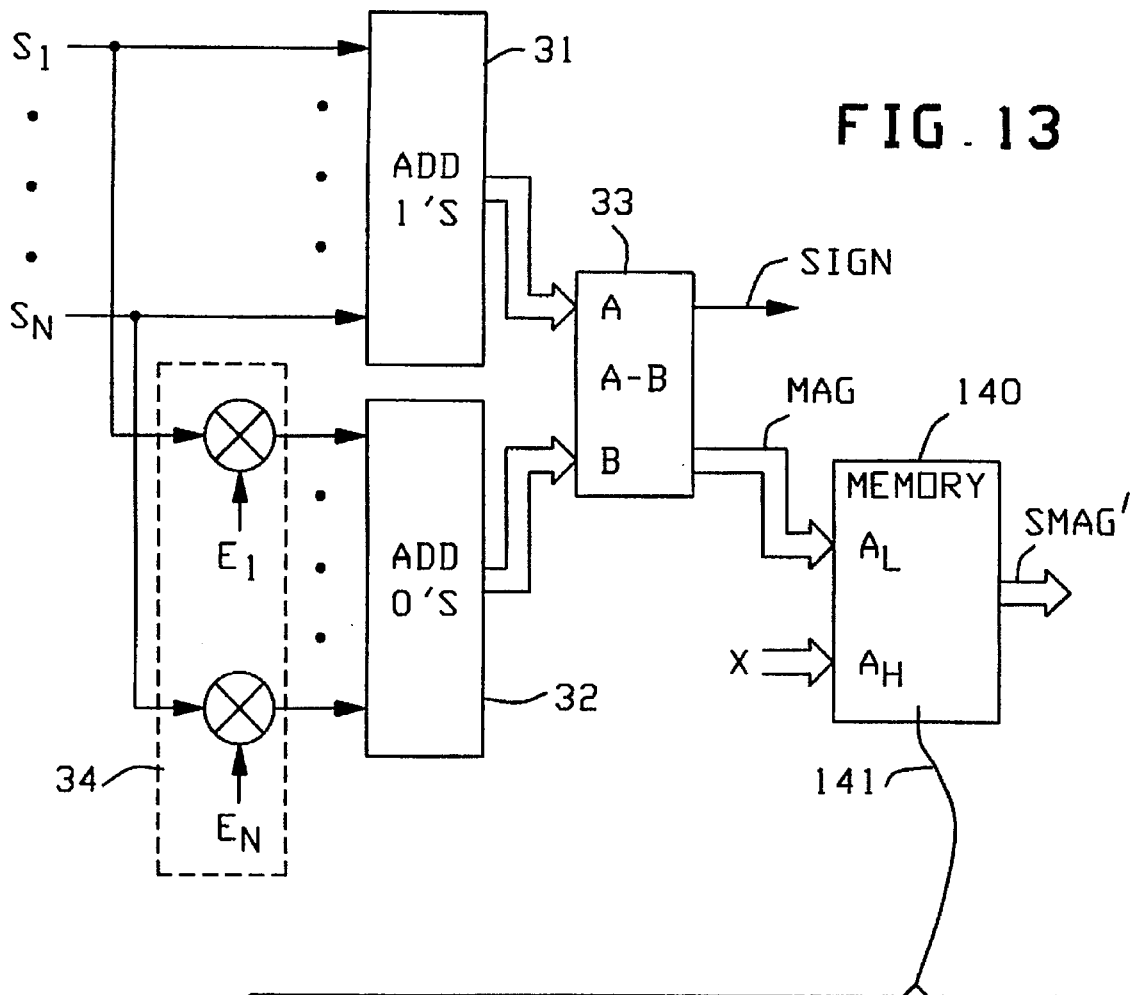
FIG. 13 shows one internal structure for a digital combiner circuit which is included in the electronic transmitter of FIG. 12.

One preferred embodiment of the digital channel combiner circuit 131 is shown in FIG. 13. That embodiment includes components 31, 32, 33, 34 and 140. Components 31 through 34 form the SIGN and MAG signals just like the components 31 through 34 of the FIG. 3 digital combiner circuit; and those SIGN and MAG signals respectively indicate the sign and magnitude of the number of "1" chips minus the number of "0" chips that concurrently occur in the chip sequences $S_1$ through $S_N$ which encode actual data.

By comparison, component 140 is a memory which stores multiple non-linearly distorted representations SDMAG' of each value of the signal MAG. Those distorted representations SDMAG are selectively addressed and read from the memory 140 by the signals MAG and X which are sent to the memory address inputs $A_L$ and $A_H$.

In FIG. 13, a table 141 is provided which shows an example of the SDMAG' signals which are stored in and read from the memory 141 in response to the address signals X and MAG. Those SDMAG' signals which are shown in row 142 are read from the memory 140 when a total of five chip sequences $S_1$ through $S_5$ encode actual data; and those SDMAG' signals which are shown in row 143 are read from the memory 140 when six chip sequences $S_1$ through $S_6$ encode actual data.

In the case where X is equal to five, the signal MAG will have magnitudes of 1, 3, and 5. Magnitude 1 occurs for twenty different combinations of the chip sequences $S_1$ through $S_5$; magnitude 3 occurs for ten different combinations; and magnitude 5 occurs for only two different combinations. Thus, the probability of occurrence for MAG=1 is 20/32; the probability of occurrence for MAG=3 is 10/32; and the probability of occurrence for MAG=5 is 2/32. This is indicated in table 141 by the column labeled PROB.

To obtain the SDMAG' signals, their magnitudes are made large when the probability of occurrence of the corresponding MAG signals is large; and vice-versa. This is indicated in table 141 by the column labeled DMAG'. Then, to obtain the SDMAG' signals which are stored in the memory 140, the distorted magnitudes DMAG' are each multiplied by a scale factor (such as 32÷5).

Similarly, when X is equal to six, the MAG signal will have values of 0, 2, 4, and 6. Magnitude 0 occurs for twenty different combinations of the chip sequences $S_1$ through $S_6$; magnitude 2 occurs for thirty different combinations; magnitude 4 occurs for twelve different combinations; and magnitude 6 occurs for two different combinations.

Accordingly, to obtain the corresponding output signals SDMAG, the MAG signals of 0, 2, 4, and 6 are non-linearly distorted to 6, 5, 4 and 3. This is indicated in table 141 by the column labeled DMAG'. Then, to obtain the SDMAG' signals which are stored in the memory 140, each of the distorted magnitudes DMAG' is multiplied by 32÷8.

A calculation of the peak-to-average power ratio of the signals which are transmitted by the FIG. 12 circuit is shown in FIG. 14. In this calculation, the number of chip sequences which encode actual data signals is set to five, and the scale factor is set equal to one. Thus, DMAG' equals SDMAG'.

To begin the calculation, equation eq30 of FIG. 14 gives an expression for the average power in the signal DMAG'. At any one particular time instant, transmitted signal power will be proportional to the square of the magnitude of the signal DMAG'. For the case where X is equal to five, signal DMAG' has magnitudes of 5, 4 and 3. Magnitude 5 occurs for twenty different combinations of the chip sequences $S_1$ through $S_5$; magnitude 3 occurs for ten different combinations; and magnitude 5 occurs for two different combinations. Thus, the average power in the transmitted signal from the FIG. 14 circuit is expressed by the term 151 in equation 14. Then, the peak-to-average power ratio is obtained by dividing the peak power with the average power from term 151; and this is performed by equation eq31.

A comparison of equation eq31 with equation eq11 of FIG. 9 shows that the peak-to-average power ratio for the FIG. 12 circuit is more than four times smaller than the peak-to-average power ratio for the FIG. 1 circuit. Consequently, the maximum distance over which signals from the FIG. 12 circuit can be received is more than four times the maximum distance over which signals from the FIG. 1 circuit can be received.

All of the calculations which occur in of FIG. 14 can be repeated for different values of X. And, such calculations show that as X increases, the improvement in the peak-to-average power ratio which is obtained by the FIG. 12 transmitter also increases.

Figure 15A:
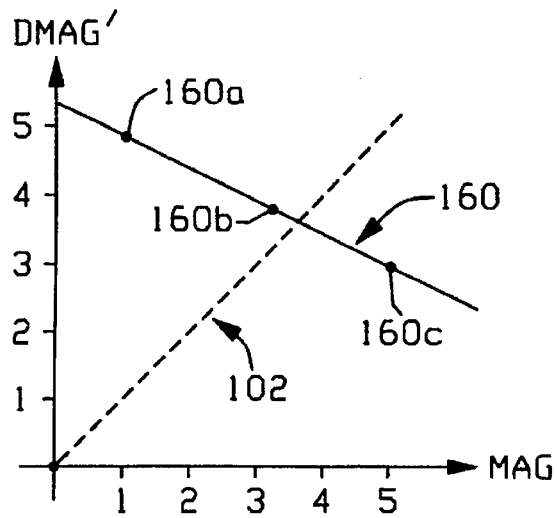
FIG. 15A shows one example of the relation between the signals MAG and DMAG' which occur in the electronic transmitter of FIG. 12.

Turning now to FIG. 15A, it illustrates in a graphical form the relation between the signal MAG and its distorted representation DMAG' for the case where X is equal to five. There, a curve 160 has three points 160a, 160b and 160c which respectively show that magnitudes 1, 3, and 5 of the MAG signal are non-linearly distorted to magnitudes 5, 4, and 3 of the DMAG' signal. By comparison, if the signal MAG was simply amplified in a linear fashion to obtain the DMAG' signal, then MAG and DMAG' would be graphically related by the straight line 102 which passes through the graph's origin 101.

Figure 15B:
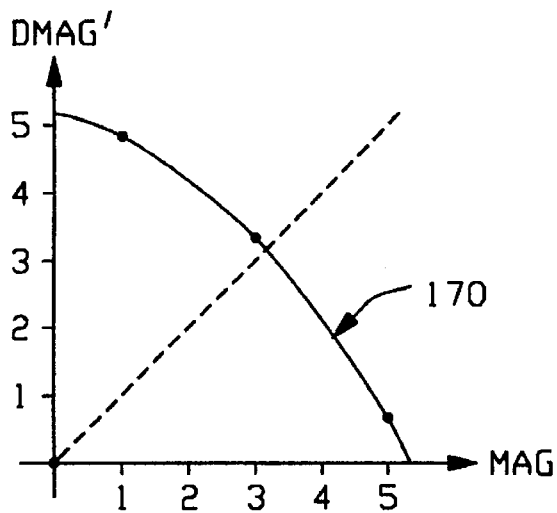
FIG. 15B shows another example of the relation between the signals MAG and DMAG' which occur in the electronic transmitter of FIG. 12.
Figure 15C:
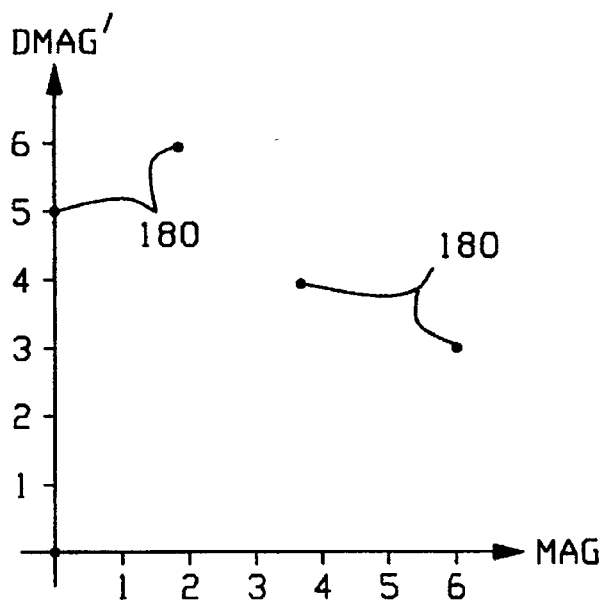
FIG. 15C shows still another example of the relation between the signals MAG and DMAG' which occur in the electronic transmitter of FIG. 12.

Two additional examples of how the signal MAG may be non-linearly distorted in order to decrease the peak-to-average power ratio of the transmitted output signal are shown in FIGS. 15B and 15C. In FIG. 15B, the relation between the signal MAG and its non-linearly distorted representation DMAG' is given by a curve 170. With this distortion, signal DMAG' decreases in magnitude at a variable rate as the signal MAG varies from a minimum to a maximum. By comparison, in FIG. 15A, the distorted signal DMAG' decreases in magnitude at a constant rate as the signal MAG varies from a minimum to a maximum.

Note that the distortion which occurs in FIG. 15A and FIG. 15B is in one respect just the opposite of the distortion which occurs in FIG. 11A, FIG. 11B, and FIG. 11C. In FIG. 15A and FIG. 15B, the distorted signal DMAG' monotonically decreases in magnitude as signal MAG varies from a minimum to a maximum; whereas in FIG. 11A, FIG. 11B, and FIG. 11C, the distorted signal DMAG monotonically decreases in magnitude as signal MAG varies from a maximum to a minimum.

In FIG. 15B, the average power of the DMAG' signal will be larger than the average power of the MAG signal because the non-linear distortion 170 makes the magnitudes of the DMAG' signal large when the corresponding magnitudes of the MAG signal occur frequently. At the same time, the DMAG' signal and the MAG signal have the same peak power because their peak amplitudes are the same.

In FIG. 15C, the relation between the signal MAG and its distorted representation DMAG' is shown by a set of four dots 180. With this distortion, the distorted output signal DMAG' increases in magnitude and then decreases in magnitude as the MAG signal varies from a minimum to a maximum. Signal DMAG' respectively has magnitudes of 5, 6, 4, and 3 when the MAG signal has magnitudes of 0, 2, 4 and 6. This corresponds to the distortion which is shown in the FIG. 13 table at row 143.

In FIG. 15C, the average power of the DMAG' signal will be larger than the average power of the MAG signal because the non-linear distortion 180 makes the magnitudes of the DMAG' signal large when the corresponding magnitude of the MAG signal occur frequently. And here again, the DMAG' signal and the MAG signal have the same peak power because their peak amplitudes are the same.

A characteristic of the distortion which occurs in all of the FIGS. 15A, 15B, and 15C is that the distorted output signal DMAG' has its largest magnitude when the signal MAG has a magnitude which occurs most frequently. That peak magnitude of the DMAG' signal can occur when the MAG signal is at a minimum, such as in FIGS. 15A and 15B; or it can occur when the MAG signal is between a maximum and a minimum, such as in FIG. 15C.

To recover the data bits which are encoded in the distorted signals from the transmitters of FIGS. 8 and 12, those distorted signals are sent through a receiver circuit that has a gain which is the inverse of the gain with which the distorted signals are generated. By this operation, the undistorted MAG signal is regenerated. Then, from the undistorted MAG signal, the digital input signals $D_1$ through $D_N$ are recovered in a conventional fashion, as is taught, for example, in U.S. Pat. No. 5,031,173 entitled "Decoder For Added Asynchronous Bit Sequences" by R. short, C. Rushforth, and Z. Xie and which is assigned to the assignee of the present invention.

An example which illustrates how the undistorted MAG signal is regenerated from the distorted DMAG' signal is shown in FIG. 16. There, the column which is labeled MAG shows signal magnitudes of 1, 3, and 5; and the column which is labeled DMAG' lists corresponding signal magnitudes of 5, 4, and 3. This is identical to the distortion which is shown in FIG. 15A.

Also, in FIG. 16, the column which is labeled G shows the gain by which the signal MAG must be multiplied by in order to obtain the distorted signal DMAG'. Further, the column which is labeled IG shows the inverse gain by which the distorted signal DMAG' must be multiplied in order to regenerate the original MAG signal. That inverse gain which is shown in the IG column is the gain which is applied by the receiver circuit in order to regenerate the MAG signal.

Various preferred embodiments of the invention have now been described in detail. In addition, however, many changes and modifications can be made to the details of these preferred embodiments without departing from the nature and spirit of the invention.

For example, all of the components 31–34 in the digital combiner circuit of FIG. 9 can be replaced with components 41–44 of FIG. 4, or components 51–53 of FIG. 6 or components 61–62 of FIG. 7. Similarly, all of the components 31–35 in the digital combiner circuit of FIG. 13 can be replaced with components 41–44 of FIG. 4, or components 51–53 of FIG. 6, or components 61–62 of FIG. 7.

Also, as another modification, the distortion which was described in conjunction with FIGS. 11A–11C and FIGS. 15A–15B may also be applied to an analog input signal. For example, in FIG. 11A, the signal MAG can be an analog input signal which has a magnitude that varies continuously from 0 to 5; and the signal DMAG can be an analog output signal which has a magnitude that various continuously from 3 to 5. To generate the analog signal DMAG, the analog signal MAG is simply multiplied by a gain which is given by the curve 100.

Similarly, in FIG. 15A, the signal MAG can be an analog input signal which varies continuously from 0 to 5; and the signal DMAG' can be an analog output signal which varies continuously from 3 to 5.5. Such an analog DMAG' signal is generated by multiplying an analog MAG signal with a gain which is given by the curve 160.

Accordingly, it is to be understood that the present invention is not limited to just the details of the illustrated preferred embodiments but is defined by the appended claims.

What is claimed is:

1. An electronic data transmission system, having a low peak-to-average power ratio, which is comprised of:

a transmitter circuit which receives an input signal and in response generates a distorted output signal by generating said output signal with a large magnitude when said input signal has a high probability of occurrence and generating said output signal with a small magnitude when said input signal has a low probability of occurrence; and, a receiver circuit, coupled to receive said distorted output signal over a communication channel, which regenerates said input signal by amplifying said distorted output signal with a gain that is the inverse of the gain by which said distorted signal is generated.

2. An electronic data transmission system according to claim 1 wherein said input signal is a digital input signal which consists of multiple sequences of "1" and "0" chips that are synchronized in parallel, with said input signal magnitude being the absolute value of the number of "1" chips minus the number of "0" chips that concurrently occur, and with said distorted output signal having a maximum magnitude when said input signal has a minimum magnitude.

3. An electronic data transmission system according to claim 2 wherein said distorted output signal monotonically decreases to a nonzero magnitude as the magnitude of said input signal varies from a minimum to a maximum.

4. An electronic data transmission system according to claim 2 wherein said distorted output signal monotonically decreases at a constant rate as the magnitude of said input signal varies from a minimum to a maximum.

5. An electronic data transmission system according to claim 2 wherein said distorted output signal monotonically decreases at a variable rate as the magnitude of said input signal varies from a minimum to a maximum.

6. An electronic data transmission system according to claim 2 wherein said transmitter circuit includes a logic circuit which forms a signed multi-bit digital signal which indicates the number of "1" chips minus the number of "0" chips that concurrently occur in said synchronized chip sequences, and a memory circuit which is addressed by the magnitude of said signed multi-bit digital and generates the magnitude of said distorted output signal in response thereto.

7. An electronic data transmission system according to claim 2 wherein said transmitter circuit includes a logic circuit which forms an unsigned multi-bit digital signal which indicates the number of "1" chips that concurrently occur in said synchronized chip sequences, and a memory circuit which is addressed by said unsigned multi-bit digital signal and generates said distorted output signal is response thereto.

8. An electronic data transmission system according to claim 1 wherein said input signal is a digital input signal which consists of multiple sequences of "1" and "0" chips that are synchronized in parallel, with said input signal magnitude being the absolute value of the number of "1" chips minus the number of "0" chips that concurrently occur, and wherein said distorted output signal increases in magnitude and then decreases in magnitude as the magnitude of said input signal varies from a minimum to a maximum.

9. An electronic data transmission system according to claim 8 wherein said transmitter circuit includes a logic circuit which forms a signed multi-bit digital signal which indicates the number of "1" chips minus the number of "0" chips that concurrently occur in said synchronized chip sequences, and a memory circuit which is addressed by the magnitude of said signed multi-bit digital and generates the magnitude of said distorted output signal in response thereto.

10. An electronic data transmission system according to claim 8 wherein said transmitter circuit includes a logic circuit which forms an unsigned multi-bit digital signal which indicates the number of "1" chips that concurrently occur in said synchronized chip sequences, and a memory circuit which is addressed by said unsigned multi-bit digital signal and generates said distorted output signal is response thereto.

11. An electronic data transmission system according to claim 1 wherein said input signal is an analog input signal, and said distorted output signal has a maximum magnitude when said input signal has a minimum magnitude.

12. An electronic data transmission system according to claim 11 wherein said distorted output signal monotonically decreases to a nonzero magnitude as the magnitude of said input signal varies from a minimum to a maximum.

13. An electronic data transmission system according to claim 11 wherein said distorted output signal monotonically decreases at a constant rate as the magnitude of said input signal varies from a minimum to a maximum.

14. An electronic data transmission system according to claim 11 wherein said distorted output signal monotonically decreases at a variable rate as the magnitude of said input signal varies from a minimum to a maximum.

* * * * *